United States Patent
Schmigel et al.

(10) Patent No.: US 6,790,367 B2
(45) Date of Patent: Sep. 14, 2004

(54) METHOD AND APPARATUS FOR SEPARATING AND MEASURING SOLIDS FROM MULTI-PHASE WELL FLUIDS

(75) Inventors: Kevin Schmigel, Calgary (CA); David Speed, Calgary (CA); Peter Stefureak, Calgary (CA)

(73) Assignee: Northland Energy Corporation, Calgary (CA)

( * ) Notice: Subject to any disclaimer, the term of this patent is extended or adjusted under 35 U.S.C. 154(b) by 0 days.

(21) Appl. No.: 10/284,173

(22) Filed: Oct. 31, 2002

(65) Prior Publication Data

US 2004/0020860 A1 Feb. 5, 2004

(51) Int. Cl.[7] .................. B01D 17/038; B01D 21/24
(52) U.S. Cl. .................. 210/740; 210/744; 210/747; 210/788; 210/800; 210/808; 210/103; 210/104; 210/109; 210/116; 210/138; 210/143; 210/170; 210/188; 210/512.1; 210/533; 494/1; 494/2; 494/10; 494/37; 209/715; 209/725; 166/53; 166/267; 96/156; 96/157; 96/209; 96/408
(58) Field of Search .................. 210/739, 740, 210/744, 747, 767, 787, 788, 800, 808, 97, 103, 104, 109, 116, 117, 138, 143, 170, 188, 512.1, 513, 533; 494/1, 2, 10, 37; 209/715, 725; 166/53, 267; 96/156, 157, 209, 408; 95/241, 261; 55/459.1

(56) References Cited

U.S. PATENT DOCUMENTS

| | | |
|---|---|---|
| 3,445,061 A | 5/1969 | Nilson |
| 3,986,663 A | 10/1976 | Jonsson |
| 4,014,791 A | 3/1977 | Tuttle |
| 4,133,759 A * | 1/1979 | Ikeda et al. .................. 210/104 |
| 4,233,154 A | 11/1980 | Presley |
| 4,555,332 A | 11/1985 | Francis |
| 4,846,780 A | 7/1989 | Galloway |
| 4,889,638 A | 12/1989 | Rockford |
| 5,002,657 A | 3/1991 | Botts |
| 5,045,046 A | 9/1991 | Bond |
| 5,948,271 A | 9/1999 | Wardwell |
| 6,143,183 A | 11/2000 | Wardwell |
| 6,322,710 B1 | 11/2001 | Katsumata |

* cited by examiner

Primary Examiner—David A. Reifsnyder
(74) Attorney, Agent, or Firm—Merek, Blackmon & Voorhees, LLC

(57) ABSTRACT

A method and an apparatus for separating and measuring solids from multi-phase well fluids. The apparatus comprises a separator; an upper solids level and a lower solids level sensor, both connected to the separator; a dump valve operatively connected to the separator; and a control module operatively connected to the dump valve to move the dump valve between an open and a closed position. The upper solids level sensor generates a first signal when the upper level of accumulated solids-within the separator reaches a pre-determined upper level. The lower solids level sensor generates a second signal when the upper level of accumulated solids within the separator reaches a predetermined lower level. The control module receives the first and second generated signals such that upon receipt of the first signal the control module causes the dump valve to open and upon receipt of the second signal the control module causes the dump valve to close.

20 Claims, 1 Drawing Sheet

METHOD AND APPARATUS FOR SEPARATING AND MEASURING SOLIDS FROM MULTI-PHASE WELL FLUIDS

FIELD OF THE INVENTION

This invention relates to both a method and an apparatus for separating and measuring solids from a multi-phase stream of well fluids.

BACKGROUND OF THE INVENTION

When drilling a well or borehole into the earth and through underground formations a common concern in virtually every application is the collection, separation, disposal, and in some cases the measurement, of the well fluids expelled from the well during the drilling process. Regardless of whether an overbalanced, balanced or under balanced drilling technique is utilized, pressurized drilling fluid returns are expelled from the well and must be treated in order to separate the components, recycle particular materials, and process or otherwise dispose of the remaining fluids and their constituent parts. Depending upon the nature of the drilling process being utilized and the geology through which the wellbore is drilled, the drilling fluid returns may include a wide variety of solid, liquid and/or gas components. Where the well is an oil or gas well, drilling fluid returns typically include oil, water, rock particulants (sand), natural gas, and various other hydrocarbon compounds. The encountering of high pressure underground formations, in combination with the fact that in most drilling operations high pressure drilling fluids are pumped from the surface down into the borehole to help fluidize cuttings and drive them upwardly out of the well, results in the drilling fluid returns extracted from a well often being at a relatively high pressure. For environmental and economic reasons the multi-phase returns must usually be separated and processed before their components can be recycled and put to further use or disposed. Since the returns are in many cases at elevated pressures or contain noxious or hazardous materials, their processing necessitates the use of dedicated and specialized equipment.

Multi-phase well fluids are also typically generated during the fracing and testing of oil and gas wells, and are commonly encountered in producing wells. As in the case of the drilling of a wellbore into the earth, multi-phase returns generated in producing oil and gas wells, and those generated during the fracing or testing of a well, are typically processed with specialized equipment to separate their component parts, avoid the release of hazardous materials into the air or the environment, and in some cases to measure the volumetric rate of production of solid phase returns.

Current techniques and equipment that have been developed to process multi-phase well fluids typically employ the use of one or more separation vessels that are primarily designed to separate the solid, liquid and gas components of the returns. In some instances the treatment of the returns is carried out in two or more separate and distinct stages. For example, an initial separator may be utilized wherein a portion of the solid component (ie sand) is separated from the well returns. The gas, liquid and any solids that may be carried over into the gas and liquid phases are then transported to a subsequent separation stage for further processing. When a high pressure separator is used a significant amount of the sand is removed thereby helping to minimize erosional effects that may otherwise occur if the solid particulate material were allowed to flow through the piping, valves and other components of the separation system. In addition, since the sand is separated at full wellhead pressure, the relative size of the equipment necessary can be kept to a minimum as the process is conducted prior to any gas expansion that will occur at a downstream low pressure stage.

While such prior existing separation methods and devices have been relatively effective, they all suffer similar inherent limitations when it comes to the disposal or removal of sand separated out of the returns. Prior systems also do not readily provide for the volumetric measurement of the sand component expelled from the well. Traditionally sand that has been extracted from multi-phase well fluids by means of a separation vessel has been removed from the vessel through the manual operation of a dump valve or similar apparatus. As sand accumulates within the separation vessel an operator would typically activate a dump valve to allow the sand to be removed for further processing or disposal. In order to lengthen the interval between the time that an individual would be required to dump the accumulated sand, others have increased the size of their separation vessels providing a greater volume within which sand can accumulate. However, doing so runs contrary to one of the reasons for utilizing an initial well-head pressure separation stage; namely, the ability to minimize the size of the necessary equipment. As a result, others have suggested that the dump valve be controlled by a timer that is set to open the valve after a pre-determined interval. In such instances a "guesstimate" of the volume of solids produced over time is prepared and the timer controlling the dump valve set to correspond to an anticipated solid production level. Unfortunately, this less than scientific method creates significant problems when the valve is open for too long and gas carry under occurs (particularly if there is hydrogen sulfide present). Similarly, problems will be encountered where there are no solids present that require the opening of the dump valve, in which case there will be an unrestricted passage of multi-phase well fluids through the dump valve resulting in increased disposal costs. Further, where the time interval that the dump valve is left open is too short, an excessive amount of solids may build up within the separation vessel, potentially resulting in a solid carry over into the separation stage. An increased volume of solids in a subsequent separation stage can significantly increase the erosion of downstream piping and components.

The "timed" method of opening and closing a dump valve suffers from the further limitation of making it difficult to measure the volume of solids produced from the well. To determine a solids production rate a separate tank (having some form of gauge or other measurement device) into which the solids can be placed and thereafter measured is most often used. Aside from having a low degree of accuracy, the use of such equipment increases the overall physical size of the separation system. If the well contains hydrogen sulfide or other toxic gases, it will be necessary to utilize a vacuum truck to remove the solids from the separation vessel thereby even further increasing the difficulty in measuring the volume of solids produced. As a result, such prior existing methods provide only a general estimate of the volume of solids production, at best.

Rather than directly measuring solids production, others have suggested monitoring for the presence of solids within multi-phase well fluid returns through the use of an erosion/corrosion probe. Such a unit is typically placed in a fitting within the returns line so that it intrudes into the stream of untreated well fluids flowing from the well to the separation system. The probe will then be exposed to the erosion generated by solids passing through the pipeline. A small voltage is passed through the probe such that as the probe erodes there is a reduction in its resistance that may be measured and used to calculate an equivalent reduction in probe diameter, and hence determine the presence of solids in the well returns. Unfortunately while such systems can be used to predict the presence of solids within well fluids, and to some degree an increase or decrease in the amount of solids present, they are incapable of quantifying the volume of solid production from the well. Other similar systems that are based upon acoustic probes generally only identify the presence of solids and their range of accuracy is normally limited at low solid concentrations.

SUMMARY OF THE INVENTION

The invention therefore provides a method and an apparatus for separating and measuring solids from multi-phase well fluids that helps to address some of the deficiencies in prior existing devices. The invention provides for the treatment of multi-phase well returns that allows for the automatic removal of accumulative solids from the separation vessel only when necessary, and then only to the extent that the solids are removed without the threat of gas or liquid carry under. At the same time, the invention provides a method and apparatus to accurately quantify the volume of solids that are produced by the well and separated from the well fluids.

Accordingly, in one of its aspects the invention provides a method for separating and measuring solids from multi-phase well fluids extracted from a well, the method comprising the steps of directing said multi-phase well fluids to a separator to separate at least a portion of any solids present in said well fluids from any liquid and gas phase components of said well fluid; establishing an upper maximum and a lower minimum limit within said separator for accumulated solids separated from said multi-phase well fluids, said upper maximum and lower minimum limits established through the use of at least one upper sensor and at least one lower sensor; upon said accumulated solids in said separator reaching said upper maximum limit, generating a first signal with said upper sensor and directing said first signal to a control module; upon said accumulated solids in said separator reaching said lower minimum limit, generating a second signal with said lower sensor and directing said second signal to said control module; and, upon receipt of said first signal said control module causing a dump valve operatively connected to said separator to open allowing a portion of said accumulated solids to be removed from said separator, upon receipt of said second signal said control module causing said dump valve to close and prevent further removal of accumulated solids from said separator to thereby limit liquid or gas carry under where said multi-phase well fluids include a liquid or gas component.

In a further aspect the invention provides a method for separating and measuring solids from multi-phase well fluids from a wellbore, the method comprising the steps of; directing multi-phase well fluids generated from the wellbore to a separator designed to separate at least a portion of any solids from gas phase components present in said multi-phase well fluids; through the use of at least one upper level sensor connected to said separator, establishing an upper maximum limit within said separator for the accumulation of solids separated from said multi-phase well fluids; through the use of at least one lower level sensor connected to said separator, establishing a lower minimum limit within said separator for accumulated solids separated from said multi-phase well fluid, said lower minimum limit designed to maintain a minimum volume of solids within said separator and to thereby help prevent gas carry under when solids are extracted from said separator; generating a first signal with said upper level sensor when the upper level of said accumulated solids in said separator reaches said upper maximum limit and generating a second signal with said lower level sensor when the upper level of said accumulated solids in said separator reaches said lower minimum limit, said first and second signals directed to a control module, said control module operating a dump valve connected to said separator and causing said dump valve to open and close to thereby maintain the level of said accumulated solids in said separator between said upper maximum and said lower minimum limits; and, with a density measuring device and a flow measurement device, measuring the density of solids separated from said multi-phase well fluids and calculating the flow of solids from said separator when said dump valve is open, thereafter, with said measured density and said calculated flow rate determining a volumetric measurement of solids separated from said multi-phase well fluids by said separator.

The invention also provides an apparatus for separating and measuring solids from multi-phase well fluids from a wellbore, the apparatus comprising; as separator for separating at least a portion of any solids from gas phase components present in said multi-phase well fluids; an upper solids level sensor connected to said separator, said upper solids level sensor generating a first signal when the upper level of accumulated solids within said separator reaches a pre-determined upper maximum level; a lower solids level sensor connected to said separator, said lower solids level sensor generating a second signal when the upper level of accumulated solids within said separator reaches a pre-determined lower minimum level; a dump valve operatively connected to said separator, said dump valve having an open and a closed position; and, a control module operatively connected to said dump valve to move said dump valve between said open and said closed positions, said control module receiving said first and second generated signals such that upon receipt of said first signal said control module causes said dump valve to move to said open position and upon receipt of said second signal said control module causes said dump valve to move to said closed position.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
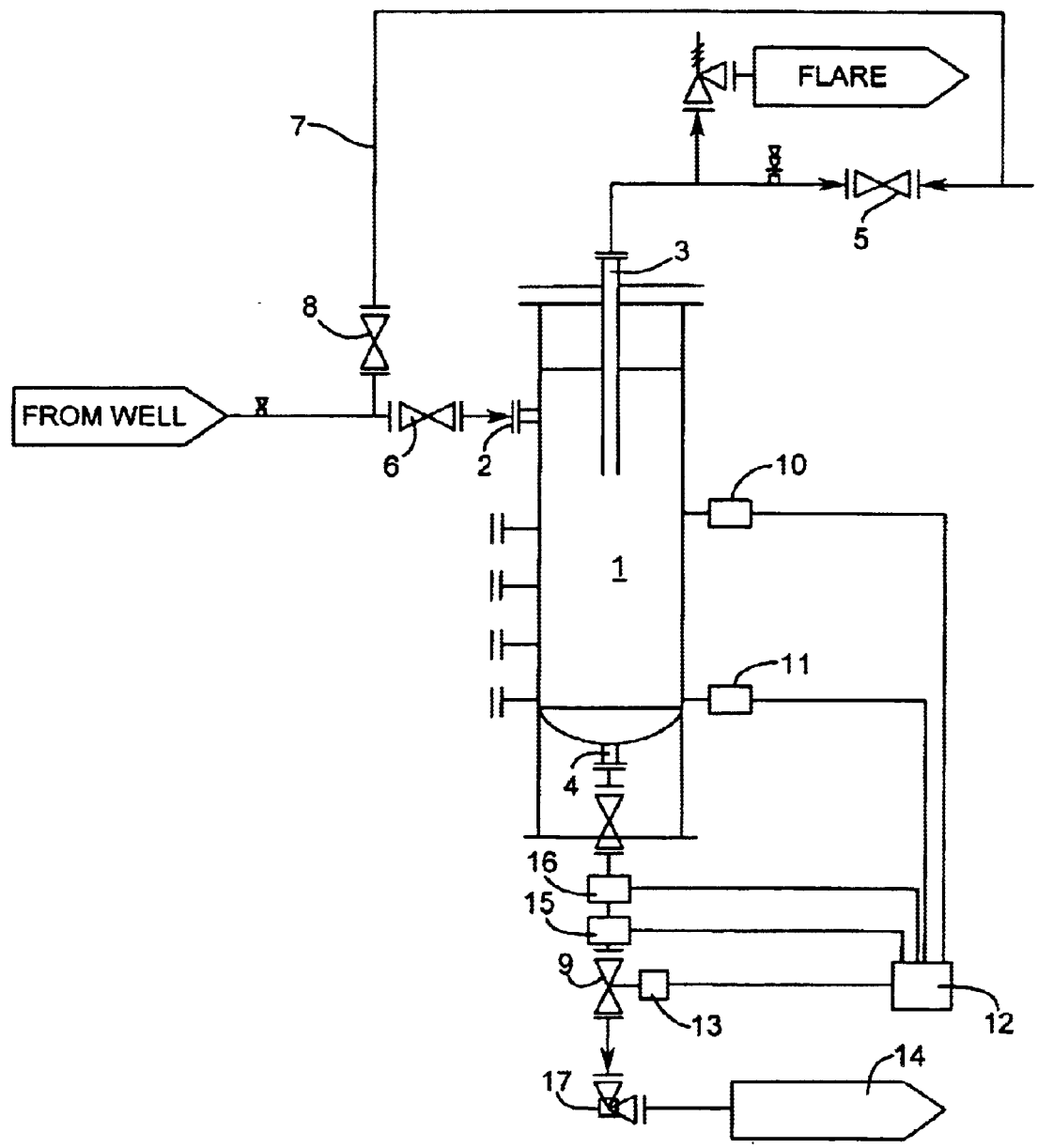
FIG. 1 is a schematic drawing showing the flow circuit and component parts of the apparatus for separating and measuring solids from multi-phase well fluids pursuant to one of the preferred embodiments of the present invention.

The present invention may be embodied in a number of different forms. However, the specification and drawings that follow describe and disclose only some of the specific forms of the invention and are not intended to limit the scope of the invention as defined in the claims that follow herein.

The method and apparatus in accordance with a preferred embodiment of the present invention is shown schematically in FIG. 1. FIG. 1 depicts a separation vessel or separator 1 that in this instance is shown as a vertically oriented centrifugal sand separator having an inlet 2 and upper gas and/or liquid outlet 3 and a lower sand and/or liquid outlet 4. It will, however, be appreciated that separator 1 may also be a horizontal separation vessel or a vertical vessel with a non-centrifugal internal separation device. In the configuration shown, pressurized fluid (from a well and typically at full wellhead pressure) is tangentially introduced into separator 1 through inlet 2 such that the centrifugal or cyclonic effect causes solid particulate material (ie sand) to fall to the bottom of the separator with gas exiting through upper outlet 3. Any liquid that may be present in the well fluid will typically be separated with the gas component and exit through outlet 3. In some cases liquid may be present within the separated sand component and may exit through outlet 4. Alternatively, liquid that collects in the separator may be removed by way of a dedicated liquid outlet (not shown). Depending upon the nature and composition of the fluid exiting through outlet 3, such materials may be vented to the atmosphere, sent directly to flare, or may become the feed for a second downstream separation or processing stage.

A control valve 5 may be connected to the conduit leading from outlet 3 and may be utilized to help control the operation of separator 1. In order to enable separator 1 to be isolated if desired or necessary, a valve 6 is preferably placed within the conduit connecting the separator to the wellhead and a bypass line 7 is used to divert well fluids around separator 1 when valve 6 is closed. In this situation, control valve 5 would also preferably be closed to prevent the back feeding of well fluids into separator 1 through outlet 3. Bypass line 7 preferably includes a bypass valve 8 that would typically be closed when well fluids are to be sent to separator 1 for processing.

In accordance with the present invention there is established a maximum and a minimum level for the upper level of accumulated of solids within separator 1. During operation, solids that are separated from well fluids introduced into the separator will have a tendency to fall to the bottom of the separator and accumulate therein. The upper maximum level of accumulated solids within separator 1 is chosen at a position that preferably allows for the maximum volume of solids to be stored within the vessel without having a detrimental effect upon the vessel's function and its ability to separate sand and other particulate material from the multi-phase well fluid. The position or height of the lower minimum solids level is determined or chosen at a point that ensures that there is a sufficient level of solids that will remain within the separator to prevent or limit gas and/or liquid carry under.

As shown in FIG. 1, a dump valve 9 is operatively connected to separator 1 such that as the dump valve is opened accumulated solids are extracted or allowed to flow from the interior of the separator. Closing the dump valve stops the flow of solids from the separator and results in solids that are separated from the multi-phase well fluid once again becoming accumulated within the interior of separator 1. The lower minimum level of solids within the separator is preferably determined having regard to the flow of material through dump valve 9, the speed at which the valve may be opened and closed, the cross sectional area and volume of the portion of the interior of separator 1 where separated solids are allowed to accumulate, and having regard to the general pressures of the well fluids in concern. It will thus be appreciated that the lower minimum level for accumulated solids within the separator can vary for separators of different sizes and configurations. However, in each instance the minimum level will be chosen at a point where the level of accumulated solids within the separator is a sufficient to prevent or minimize liquid and/or gas carry under, and thereby help to prevent the escape of liquid or gas through dump valve 9.

Preventing or minimizing gas or liquid carry under can be critically important from an economical, environmental and safety standpoint. Allowing excessive gas or liquid to pass through dump valve 9 may significantly increase disposal and processing costs associated with the solids, particularly where hydrogen sulfide or other toxic components are present. In addition, in many instances a portion of the gas and/or liquid from the multi-phase well returns is extracted by means of downstream separation processes for either recycling or separate use or sale. Any gas or liquid components that are allowed to escape through dump valve 9 will limit or effect the efficiency of such downstream recovery and separation processes.

In order to maintain the upper level of accumulated solids within separator 1 between the upper maximum and lower minimum levels, the preferred embodiment of the present invention includes an upper solids level sensor 10 and a lower solids level sensor 11 that are connected to separator 1. Depending upon the nature and structure of sensors 10 and 11 they may be connected to separator 1 in a variety of different fashions. In most instances it is expected that the sidewall of the separator will be formed with a fitting to allow sensors 10 and 11 to be threaded, bolted or otherwise secured to the separator. Each of sensors 10 and 11 are capable of generating an electrical signal that is received by a control module 12 for analysis. In particular, as the upper level of accumulated sand within separator 1 rises to the point that it reaches the upper maximum level, upper solids level sensor 10 will detect that the solids have reached the upper designated maximum level and generate a signal that is sent to control module 12 to notify the control module that the separator now contains its maximum designated volume of sand. Control module 12 then sends a signal to an actuator 13 connected to dump valve 9 causing the valve to open and resulting in the flow of solids out of separator 1 through dump valve 9 and into a subsequent processing circuit or sand tank (identified generally in FIG. 1 by reference numeral 14). As the level of solids within separator 1 begins to drop, its upper level will eventually reach the predetermined lower minimum solids level. Once the level of the solids is at that particular lower level, lower solids level sensor 11 generates a signal that is sent to the control module, which in turn processes the signal and causes actuator 13 to close dump valve 9 to help prevent liquids and/or gases from passing from the separator and through the dump valve. At that point the level of solids within the separator will once again slowly begin to rise until it reaches the designated upper maximum level. The process will then repeat itself.

Control module 12 may be comprised of any one of a very wide variety of commercially available microprocessors or programmable controllers. On account of the environment within which it is likely to be operating, control module 12 will preferably be encased in a weather and explosion proof housing. In addition, the control module includes a timer, clock, or time measurement device or software that will serve as a basis from which the time interval between the opening and closing of dump valve 9 and be measured and determined.

It will be understood by those skilled in the art that a variety of different sensors could be used for upper solids level sensor 10 and lower solids level sensor 11, and that the signals sent and received by control module 12 could be electric, hydraulic or pneumatic in nature. Similarly, actuator 13 could equally be electrically, pneumatically or hydraulically operated. It should also be appreciated that while separator 1 has been described and shown in the attached drawing as a vertical cyclonic or centrifugal separator, it could just as easily be a horizontally oriented separator. In one particular embodiment of the invention that has been found by the applicant to function effectively, separator 1 is a vertical sand separator with dump valve 9 operated through an actuator comprised of an electric solenoid. In this embodiment upper solids level sensor 10 and lower solids level sensor 11 are comprised of nuclear density gauge detectors, such as those manufactured by Ohmart™ under the trade name FiberFlex Continuous Level Gauges™.

In accordance with a further embodiment of the invention there is provided a flow measurement device 15 positioned between separator 1 and dump valve 9. Flow measurement device 15 generates a signal that corresponds to the flow of solids from separator 1 through dump valve 9 when the dump valve is open. The signal generated by flow measurement device 15 is directed to control module 12. In addition, there may also be positioned between separator 1 and dump valve 9 a density measuring device 16 to measure the density of material flowing from the separator through the dump valve. Where such a density measuring device is used, a signal is generated corresponding to the measured density and that signal is also directed to control module 12. Upon receipt of the signal from flow measurement device 15 and the signal from density measuring device 16, control module 12 performs an analysis on the two signals and then calculates the volume of solids that are produced by separator 1. Having regard to the time frame between successive intervals of the opening and closing of dump valve 9, control module 12 is able to effectively generate an approximate solids production rate for the well. This measurement and calculation process can essentially be continuous which will virtually allow for a real-time solids production rate for the well to be determined. That production rate may be displayed to an operator in the form of raw data or, alternatively, could be plotted against time to provide an operator with a volumetric analysis of returned solids from the well over time.

The described invention also provides an operator with the ability to measure and determine the volume of solids separated from the multi-phase well fluids through an alternate method. Under this method the fixed volume of separator 1 between upper and lower sensors 10 and 11 is determined and the generation of signals from sensors 10 and 11 is monitored over time. If the volume of separator 1 between the upper and lower sensors is known, the time it takes separator 1 to accumulate enough solids to raise the upper level within the separator from the lower minimum limit to the upper maximum limit can be used to generate an approximate solids production rate for the well.

The present invention provides yet a further method by which an operator may measure and determine the volume of solids extracted from the multi-phase well fluid. Since in most instances separator 1 will be comprised of a high pressure separator that is capable of receiving wellhead pressure directly, solids flowing from the separator through dump valve 9 will preferably be directed to a choke 17 containing an internal restrictor or orifice, such that solids enter and exit the choke at a known pressure allowing for a pressure differential to be calculated. The orifice within choke 17 will be designed having regard to the general wellhead pressures that will be experienced within separator 1 and the choke will have a fixed pressure drop across its orifice for a given flow rate. The flow rate of solids from separator 1 can thus be approximated using the differential pressure as measured across choke 17 and calculating a flow rate on the basis of an incompressible liquid flow through an orifice during sonic or sub-sonic flow, depending upon the particular application. With a calculated flow rate, the time between the opening and closing of the dump valve can again be used to determine an approximate solids production rate for the well.

As will be apparent from an understanding of the invention, regardless of the particular method that is selected to measure and determine the volume of solids produced from the separator, the time between the opening and closing of the dump valve can be determined and recorded to allow for an approximated and time adjusted solids production rate to be calculated and plotted. In addition, and as indicated above, the present invention provides the ability to display such volumes and solid production rates in essentially a real-time manner such that an operator has accessible to him the rate of production of solids from the well at any given point in time. Furthermore, the described system and method provides for the complete automation of the separation of sand and particulate matter from multi-phase well fluids and the extraction of solids from the separation vessel without the direct intervention or supervision of an operator. The automated system provides a means by which there is always present a minimum level of solids within the separation vessel to help prevent any liquid or gas carry under through the dump valve.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A method for separating and measuring solids from multi-phase well fluids extracted from a well, the method comprising the steps of:
    (i) directing said multi-phase well fluids to a separator to separate at least a portion of any solids present in said well fluids from gas phase components of said well fluid;
    (ii) establishing an upper maximum and a lower minimum limit within said separator for accumulated solids separated from said multi-phase well fluids, said upper maximum and lower minimum limits established through the use of at least one upper sensor and at least one lower sensor;
    (iii) upon said accumulated solids in said separator reaching said upper maximum limit, generating a first signal with said upper sensor and directing said first signal to a control module;
    (iv) upon said accumulated solids in said separator reaching said lower minimum limit, generating a second signal with said lower sensor and directing said second signal to said control module; and,
    (v) upon receipt of said first signal said control module causing a dump valve operatively connected to said separator to open allowing a portion of said accumulated solids to be removed from said separator, upon receipt of said second signal said control module causing said dump valve to close and prevent further removal of accumulated solids from said separator to thereby gas carry under where said multi-phase well fluids include a gas component.

2. The method as claimed in claim 1 wherein said separator is a centrifugal separator, a horizontal separation vessel, or a vertical vessel with a non-centrifugal internal separation device.

3. The method as claimed in claim 1 including the further step of measuring and determining the volume of solids extracted from said multi-phase well fluids by said separator.

4. The method as claimed in claim 3 including monitoring the time between the opening and closing of said dump valve, and thereafter utilizing the time between the opening and closing of said dump valve and the measurement of the volume of solids extracted from said multi-phase well fluids by said separator to determine an approximate rate of production of solids from the well.

5. The method as claimed in claim 4 wherein said step of measuring and determining the volume of solids separated from said multi-phase well fluids comprises determining the fixed volume of said separator between said upper and said lower sensors and monitoring the generation of said first and said second signals by said upper and said lower sensors over time, and thereafter calculating a volume for said solids separated from said multi-phase well fluids and determining a solids production rate.

6. The method as claimed in claim 1 including the further step of directing said solids that flow from said separator through said dump valve to a choke such that said solids exit said choke at a reduced pressure.

7. The method as claimed in claim 6 including the step of determining the volume of solids extracted from said multi-phase well fluids through determining the flow rate of solids exiting said separator, said flow rate approximated using the differential pressure as measured across said choke to calculate a flow rate on the basis of incompressible liquid flow through an orifice.

8. The method as claimed in claim 1 including the step of measuring the density of said solids separated from said multi-phase well fluids by said separator through the use of a density measuring device.

9. The method as claimed in claim 8 including the further step of utilizing a flow measurement device to calculate the flow of said solids from said separator when said dump valve is open, and thereafter utilizing said calculated flow and said measured density of said solids to determine a volumetric measurement for said solids separated from said multi-phase well fluids by said separator.

10. The method as claimed in claim 9 including the step of monitoring and determining the time between the opening and closing of said dump valve, said time in conjunction with said volumetric measurement of solids separated from said multi-phase well fluids by said separator together used to generate a rate of production of solids from the well.

11. A method for separating and measuring solids from multi-phase well fluids from a wellbore, the method comprising the steps of:
  (i) directing multi-phase well fluids generated from the wellbore to a separator designed to separate at least a portion of any solids from gas phase components present in said multi-phase well fluids;
  (ii) through the use of at least one upper level sensor connected to said separator, establishing an upper maximum limit within said separator for the accumulation of solids separated from said multi-phase well fluids;
  (iii) through the use of at least one lower level sensor connected to said separator, establishing a lower minimum limit within said separator for accumulated solids separated from said multi-phase well fluid, said lower minimum limit designed to maintain a minimum volume of solids within said separator and to thereby help prevent gas carry under when solids are extracted from said separator;
  (iv) generating a first signal with said upper level sensor when the upper level of said accumulated solids in said separator reaches said upper maximum limit and generating a second signal with said lower level sensor when the upper level of said accumulated solids in said separator reaches said lower minimum limit, said first and second signals directed to a control module, said control module operating a dump valve connected to said separator and causing said dump valve to open and close to thereby maintain the level of said accumulated solids in said separator between said upper maximum and said lower minimum limits; and,
  (v) with a density measuring device and a flow measurement device, measuring the density of solids separated from said multi-phase well fluids and calculating the flow of solids from said separator when said dump valve is open, thereafter, with said measured density and said calculated flow rate determining a volumetric measurement of solids separated from said multi-phase well fluids by said separator.

12. The method as claimed in claim 11 including the further step of monitoring and determining the time between the opening and closing of said dump valve and thereafter utilizing said determined time together with said volumetric measurement of solids separated from said multi-phase well fluids by said separator and calculating an approximate rate of solids production from the well.

13. An apparatus for separating and measuring solids from multi-phase well fluids from a wellbore, the apparatus comprising:
  (i) a separator for separating at least a portion of any solids from gas phase components present in said multi-phase well fluids;
  (ii) an upper solids level sensor connected to said separator, said upper solids level sensor generating a first signal when the upper level of accumulated solids within said separator reaches a predetermined upper maximum level;
  (iii) a lower solids level sensor connected to said separator, said lower solids level sensor generating a second signal when the upper level of accumulated solids within said separator reaches a pre-determined lower minimum level;
  (iv) a dump valve operatively connected to said separator, said dump valve having an open and a closed position; and,
  (v) a control module operatively connected to said dump valve to move said dump valve between said open and said closed positions, said control module receiving said first and second generated signals such that upon receipt of said first signal said control module causes said dump valve to move to said open position and upon receipt of said second signal said control module causes said dump valve to move to said closed position.

14. The apparatus as claimed in claim 13 including a flow rate measurement device positioned between said separator and said dump valve, said flow measurement device generating a signal corresponding to the flow of solids from said separator through said dump valve upon the opening of said valve.

15. The apparatus as claimed in claim 14 including a density measuring device positioned between said separator and said dump valve, said density measuring device generating a signal corresponding to the density of material flowing from said separator through said dump valve, said control module receiving said signals generated by said flow rate measurement device and said density measuring device and calculating the volume of solids extracted from said multiphase well fluids by said separator.

16. The apparatus as claimed in claim 15 wherein said control module includes a timer that monitors and determines the time between the opening and closing of said dump valve such that said determined time, in conjunction with said calculated volume of solids extracted from said multi-phase well fluids by said separator, may be utilized to generate an approximate solids production rate for the wellbore.

17. The apparatus as claimed in claim 13 wherein said dump valve is hydraulically, pneumatically or electrically operated by said control module.

18. The apparatus as claimed in claim 13 wherein said upper solids level sensor and said lower solids level sensor are comprised of nuclear density gauge detectors.

19. The apparatus as claimed in claim 13 wherein said separator is a centrifugal separator, a horizontal separation vessel, or a vertical vessel with a non-centrifugal internal separation device.

20. The apparatus as claimed in claim 13 including a choke positioned downstream of said dump valve, said choke having a fixed pressure drop across its orifice such that solids exit said choke at a pressure that approximates atmospheric pressure.

* * * * *